United States Patent [19]
Hill et al.

[11] Patent Number: 5,963,849
[45] Date of Patent: Oct. 5, 1999

[54] SYSTEM FOR USING A MICROPHONE IN A BASEBALL BASE

[75] Inventors: David Blyth Hill, Pacific Palisades, Calif.; Jerry Neil Gepner, Langhorne, Pa.; Alan D. Meis; Ryan Adam Meis, both of Punta Gorda, Fla.

[73] Assignee: Fox Sports Productions, Inc., Los Angeles, Calif.

[21] Appl. No.: 08/837,808

[22] Filed: Apr. 22, 1997

[51] Int. Cl.[6] .................................................. H04B 1/03
[52] U.S. Cl. ................................ 455/66; 455/91; 455/128
[58] Field of Search ........................... 455/66, 90, 575, 455/91, 95, 97, 100, 128, 344, 347, 351; 381/91, 361

[56] References Cited

U.S. PATENT DOCUMENTS

| | | | |
|---|---|---|---|
| 4,493,486 | 1/1985 | Fuller et al. | 273/25 |
| 4,570,746 | 2/1986 | Das et al. | 181/242 |
| 4,627,620 | 12/1986 | Yang | 273/1 GC |
| 4,975,713 | 12/1990 | Sheriff | 343/795 |
| 5,080,356 | 1/1992 | Green et al. | 273/25 |
| 5,142,700 | 8/1992 | Reed | 455/344 |
| 5,161,250 | 11/1992 | Ianna et al. | 455/66 |
| 5,493,697 | 2/1996 | May | 455/66 |

FOREIGN PATENT DOCUMENTS

| | | |
|---|---|---|
| 342227/84 | 4/1985 | Australia . |
| 2150792 | 7/1985 | United Kingdom . |

*Primary Examiner*—Wellington Chin
*Assistant Examiner*—Philip J. Sobutka
*Attorney, Agent, or Firm*—Fliesler, Dubb, Meyer & Lovejoy LLP

[57] ABSTRACT

A microphone and transmitter are mounted to a baseball base such that they do not interfere with the baseball game. The microphone senses audio data and the transmitter sends the audio data to a receiver. The receiver communicates the audio data to a mixer which can insert the audio data into a television or radio signal.

19 Claims, 4 Drawing Sheets

SYSTEM FOR USING A MICROPHONE IN A BASEBALL BASE

This application is related to U.S. patent application Ser. No. 08/971,470, filed Nov. 17, 1997, entitled "SYSTEM FOR USING A MICROPHONE IN AN OBJECT AT A SPORTING EVENT," which is a continuation of U.S. patent application Ser. No. 08/638,552, filed Apr. 26, 1996, now abandoned.

BACKGROUND OF THE INVENTION

1. Field of the Invention

The present invention is directed to a system for using a microphone in an object at a sporting event.

2. Description of the Related Art

When attending a sporting event, it is advantageous to have seats close to the playing field in order to see well and hear the sounds of the game. For example, when attending a baseball game fans in seats close to the field can hear the sounds of the bat hitting the ball, the ball being caught, players sliding into a base, collisions, and other sounds from the playing field. Viewers and listeners of broadcasted sporting events cannot hear all of these sounds and, therefore, may feel isolated from the game and do not always get drawn into the excitement of the event. If broadcasters could make the viewers and listeners feel closer to and more involved with the game, viewers would be less likely to turn off the television (or radio), change channels or focus their attention elsewhere. Thus, there is a need to allow viewers and listeners to hear more sounds from the playing field so that they feel closer to and more involved with the game.

In the past, television broadcasters have put microphones around the perimeter, but outside of, the playing field. These microphones can pick up spurious crowd noise as well as noise from players when the players are not on the field. However, these microphones do not reliably pick up sounds from the playing field.

Putting microphones directly on players may allow viewers to hear the players talking; however, these microphones will not detect a lot of interesting sounds from the field and may interfere with or annoy the players.

Other attempts to broadcast sounds from the playing field include hanging microphones from the ceiling of indoor arenas. These microphones, however, do not get close enough to the playing field to detect all of the interesting sounds and this solution is not practical for an outdoor stadium.

Thus, there is a need for a system that uses microphones within the playing field that do not interfere with the play or view of the game, and that can reliably pick up and transmit sounds from the playing field.

SUMMARY OF THE INVENTION

The present invention is directed to overcome the disadvantages of the prior art. Thus, the present invention provides for a system for using a microphone with a baseball base. The baseball base has an outside surface and a channel along a portion of the outside surface. The microphone is located in the channel. The channel is at least partially filled with a non-noisemaking substance. In one embodiment, the non-noisemaking substance is silicone. Placing the microphone in a channel on the outside surface of the base helps prevent the microphone from detecting noises due to the compression of the base when the base is stepped on by a player.

The baseball base includes a shell, a pad inside the shell and a baseplate. The channel housing the microphone is in the shell. The system also includes a transmitter which is connected to the microphone. In one embodiment, the system includes a protective box secured to the baseplate and a cover removably attached to the protective box. Sealing material is placed between the cover and the protective box. The transmitter is housed within the protective box such that the transmitter is protected from moisture and dust.

It is contemplated that during a baseball game three bases could utilize the principles of the present invention (first base, second base and third base). In one embodiment, each base transmits an RF signal at a different frequency. The transmitter frequencies are selectable from a predetermined set of frequencies. A mixer can be used to choose which, if any, of the audio signals are to be inserted into the broadcast signal for television/radio broadcast.

These and other objects and advantages of the invention will appear more clearly from the following description in which the preferred embodiment of the invention has been set forth in conjunction with the drawings.

DETAILED DESCRIPTION

Figure 1:
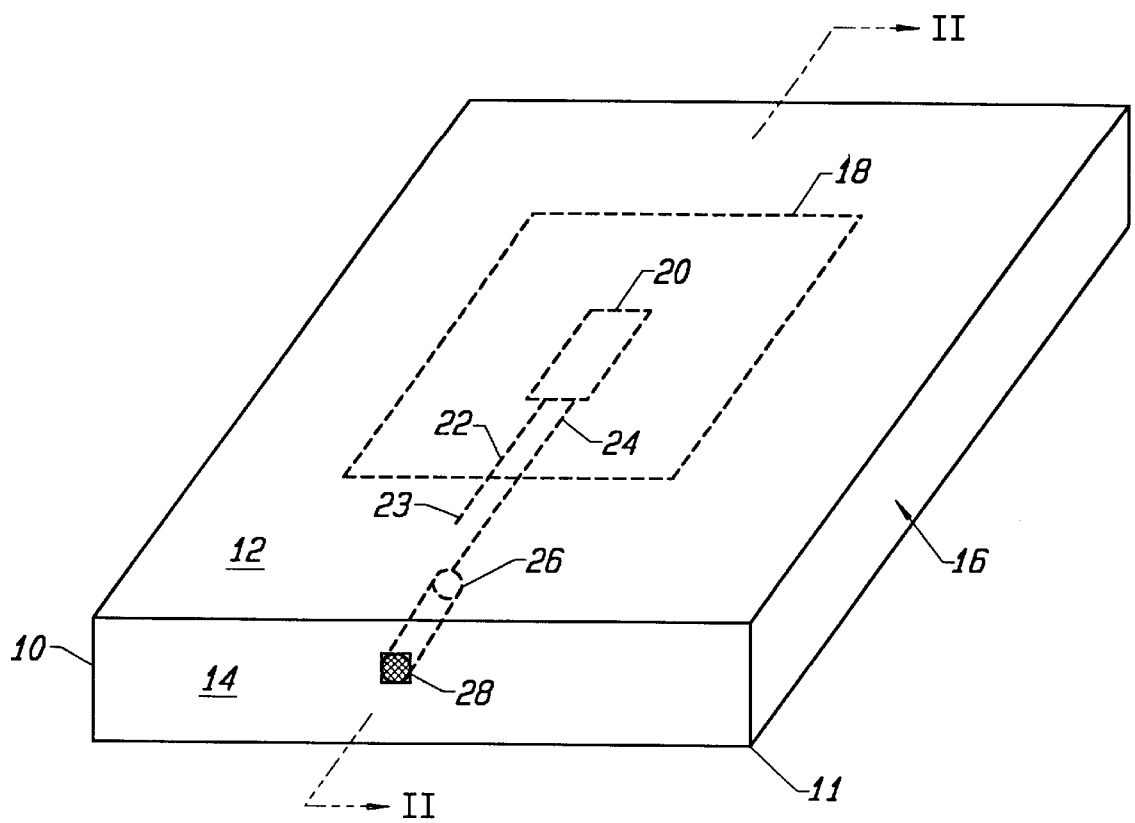
FIG. 1 depicts a perspective view of a first embodiment baseball base according to the present invention.

FIG. 1 shows a baseball base 10 which utilizes the current invention. Base 10 can be used as first base, second base or third base. It is also contemplated that the principles of the current invention could be used in a pitcher's mound, home plate or other object on the field at a sporting event. Base 10, which is of the standard dimensions and feel of regulation baseball bases, includes a base body 11 having a top surface 12 and four side surfaces (two side surfaces 14 and 16 are depicted in FIG. 1). Dotted line 18 represents a cavity 34 (see FIG. 2) inside base 10.

Mounted inside cavity 34 is a wireless transmitter 20. In the disclosed embodiment, transmitter 20 is an RF transmitter. Transmitters which utilize other spectrums are also within the spirit of the present invention. One example of an RF transmitter suitable for this application is the SK250 UHF tunable transmitter sold by Sennheiser. The frequency range of the SK250 is 450–960MHz. Transmitter 20 is powered by three AA batteries. Alternatively, transmitter 20 can be powered by a NiCad or other suitable battery. Transmitter 20 is approximately 4.6"×2.4"×0.7." In the embodiment of FIGS. 1–3, transmitter 20 is completely covered by a plastic sleeve in order to protect against moisture and dust.

Antenna connector 22 connects transmitter 20 to antenna 23, which is a whip antenna that is supplied with the SK250. Antenna 23 extends into base body 11. Other antennas that fit unobtrusively within base 10 can also be used; for example, a flat mesh antenna, a ribbon style antenna, a dipole antenna made from a flexible material and other antennas can be used. The inventors contemplate that alternative transmitters may not need an external antenna.

Microphone connector 24 connects transmitter 20 to microphone 26. Microphone 26 is miniature high quality microphone. Examples of microphones suitable for this application includes the MKE 2, MKE 102 and MKE 104 all sold by Sennheiser, or other similar microphones. Microphone 26 is approximately 3/16 of an inch in diameter with a length of 1/4 of an inch, and is mounted so that the front of microphone 26 is flush with side 14. An optional protective coating can be placed in front of microphone 26 to protect microphone 26 from dust and moisture. One example of a suitable protective covering is a latex membrane. The inventors note that a protective coating in front of the microphone could effect the performance of the microphone. Mounted in front of microphone 26 is a square shaped grill 28, having sides approximately 1/4 of an inch long. Although grill 28 is mounted on surface 14, part of surface 14 is carved out and grill 28 is thin so that it appears to be flush with surface 14. In one embodiment, microphone 26 can be mounted in a slightly recessed position so that grill 28 can be mounted flush with surface 14. Preferably, grill 28 is the same color as surface 14. Alternative embodiments can be used without a grill. Transmitter 20 and microphone 26 are shown by dotted lines in FIG. 1 because they are not visible when looking at base 10 from a perspective view.

Figure 2:
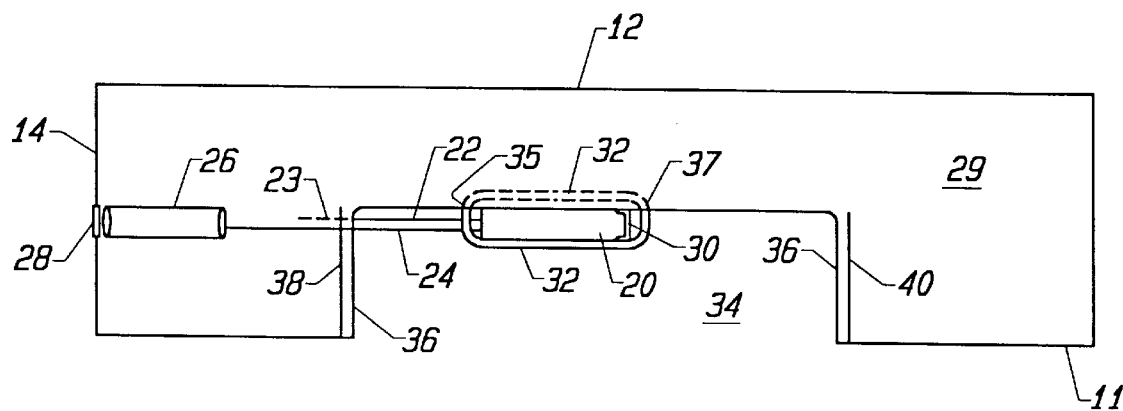
FIG. 2 is a cross-sectional view of the baseball base of FIG. 1.

FIG. 2 is a cross-sectional view of base 10 which shows how the components are mounted in base 10. The interior of base body 11 is made of a foam compound or any other suitable material. Inside base 10 is a cavity 34. Cavity 34 is open at its bottom so that if base 10 is turned upside down, cavity 34 can be accessed. When base 10 is placed on the ground, cavity 34 is defined by baseplate 36 and the ground. Baseplate 36 is a metal structure that has four sides and a top, similar to an upside down square cup. The edges between the sides and the top are rounded. Attached to each side of baseplate 36 is a metal side plate. FIG. 2 shows side plate 38 and side plate 40.

Transmitter 20 is mounted to baseplate 36 using a retaining bar 30 and a tye wrap 32. Retaining bar 30 is an extruded aluminum channel used to support the rear end of transmitter 20 and to seal the plastic sleeve covering transmitter 20. Tye wrap 32 is a plastic band that cannot be loosened without breaking after it has been tightened and secured. Two holes (35 and 37) are drilled through baseplate 36 so that tye wrap 32 can be threaded around transmitter 20, through one of the holes 35 in baseplate 36, through interior 29 and out the other hole 37 in baseplate 36; thereby, holding transmitter 20 securely against baseplate 36. In one embodiment, the holes (35 and 37) in baseplate 36 have a diameter of 3/8 of an inch and include rubber grommets. Although tye wrap 32 is shown wrapped around the length of transmitter 20, it can also be wrapped around the width of transmitter 20 instead of or in addition to the length. The arrangement shown in FIG. 2 allows for access to the transmitter for programming, repair, etc. Other mounting schemes can be used to secure transmitter 20 to baseplate 36 including schemes that do not use tye mounts or retaining bars. Additionally, transmitter 20 can be secured within bases that do not have a baseplate.

Microphone 26 sits inside interior 29. One method for positioning microphone 26 is to drill a hole from cavity 34 into interior 29 and inserting the microphone into the drilled hole.

Figure 3:
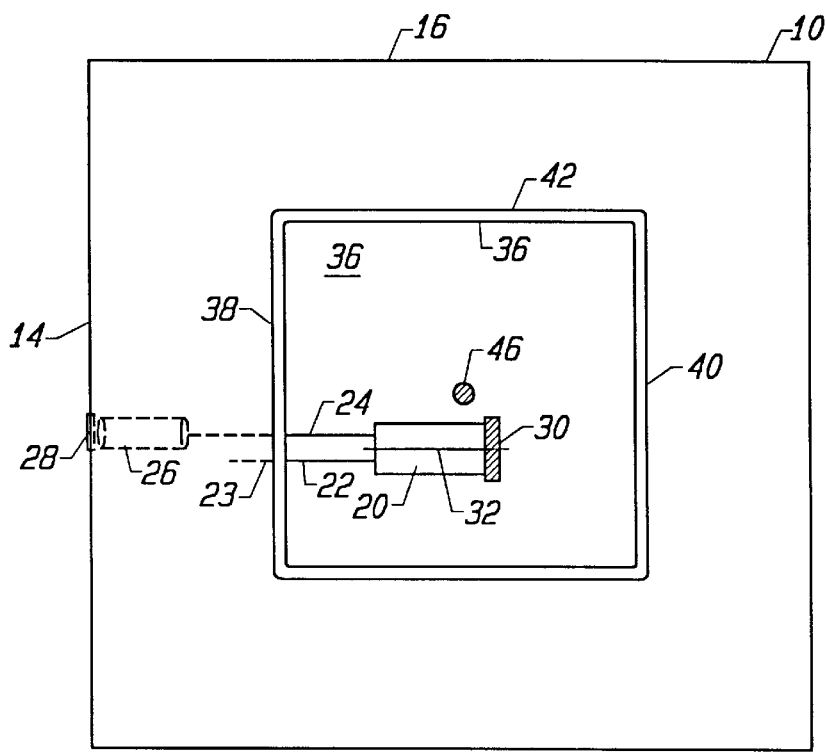
FIG. 3 is a view of the bottom of the baseball base of FIG. 1.

FIG. 3 shows the bottom of base 10. Microphone 26 is shown dotted because it is inside base 10 and cannot be seen from the bottom of base 10. Attached to the center of baseplate 36 is a mounting post 46 which is used to mount base 10 to the field of play. FIG. 3 shows the side plates 38, 40, 42 and 44 which were referenced above with respect to FIG. 2. The side plates are 1/2 inch wide and have a length equal to a side of the baseplate. Note that there is a 1/4 inch gap between the side plates and the baseplate 36. The side plates are used for support in the base. The current invention will work with bases that do not have side plates.

Figure 4:
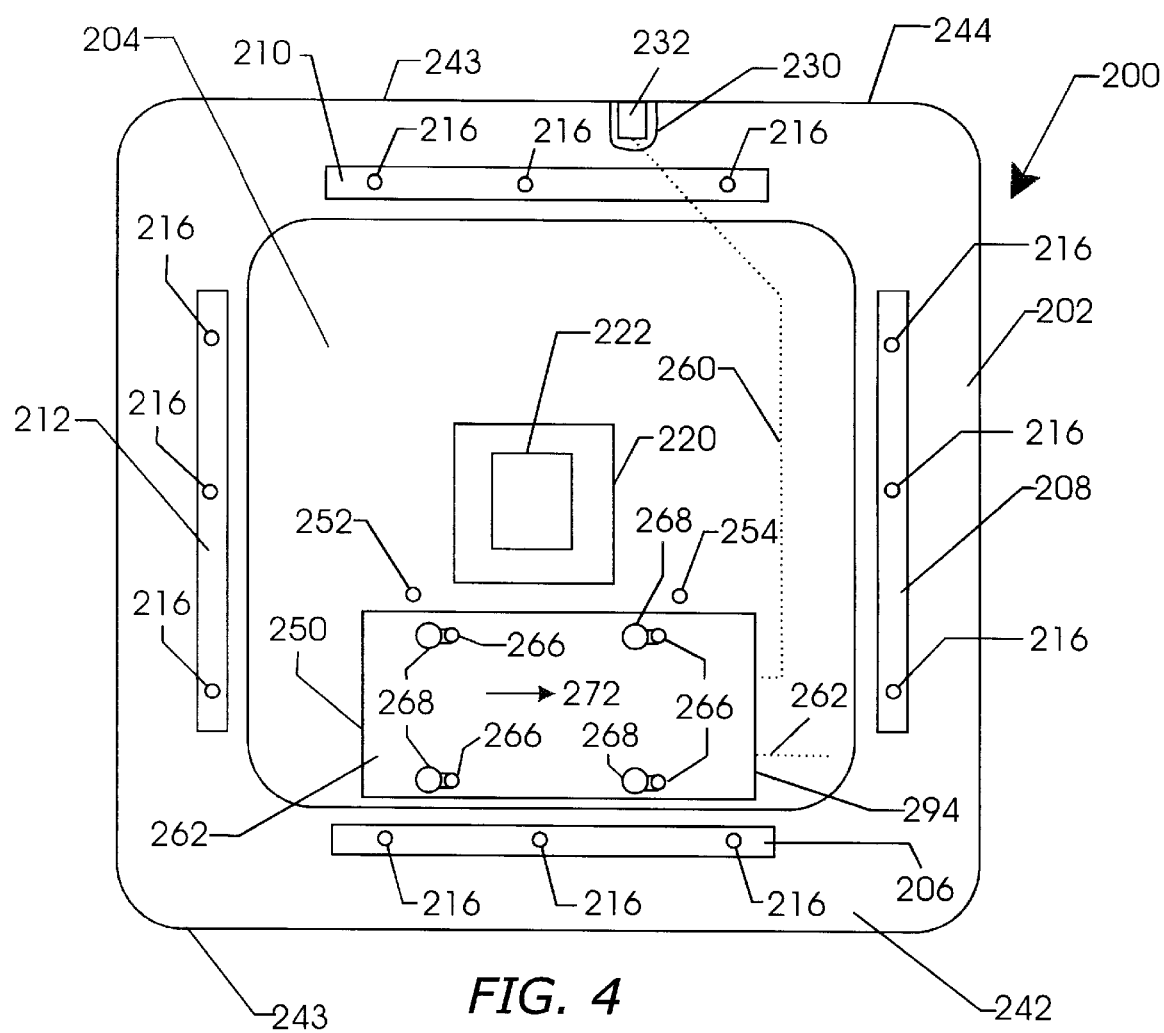
FIG. 4 is a view of the bottom of a second embodiment baseball base.

FIG. 4 shows a view of the bottom of a second embodiment baseball base 200, which is of standard dimensions and feel of regulation baseball bases. One example of a baseball base that can be modified (as described below) to utilize the present invention is the Jack Corbett model baseball base from Hollywood Bases, Inc. The outside surface of baseball base 200 is defined by a rubber shell or cover 202, which surrounds the top and sides of baseball base 200. Shell 202 has a large opening on the bottom of the base which provides access to metal baseplate 204. Enclosed within shell 202 and above baseplate 204 is a pad or cushion (not shown in the drawings). When a player steps on base 200, the pad compresses.

Baseplate 204 is attached to shell 202 using bars 206, 208, 210 and 212. Each of the bars has three holes which line up with holes in shell 202. Screws 216 are threaded through the holes in bars 208, 210, 212 and 214 and the corresponding holes in shell 202; thereby, securing baseplate 204 to shell 202. Welded to the center of baseplate 204 is a metal post support 220. Mounted to post support 220 is a metal mounting post 222, which is used to secure baseball base 200 to the playing field. Carved in the bottom of shell 202 is channel 230. Housed inside channel 230 is a microphone 232. Microphone 232 can be the same type as microphone 26, or another microphone of suitable size and quality. Microphone 232 is encapsulated with a non-noisemaking gel that absorbs vibration. One example of a suitable gel is Vibration Absorption Gel Z8006 by Zeal, a division of Kyosho Corporation. A non-noisemaking substance is used so that if the substance is compressed or subject to another force, it will not create a sound which will be detected by microphone 232. If microphone 232 is placed within the pad, the microphone may detect the sound of air rushing out of the pad when a runner steps on the base and the pad compresses. The gel is applied so that it does not interfere with the microphone's ability to detect sounds. Channel 230 is also filled with silicone to secure the microphone in place. Since rubber shell 202 is traditionally white, a white silicone should be used. The silicone is applied so that it does not block the front of microphone 232 and does not interfere with the microphone's ability to detect sounds.

Base 200 has an outside surface. A majority of the outside surface of base 200 is rubber shell 202. Other portions of the outside surface include exposed portions of baseplate 204. Channel 230 is carved out of rubber shell 202; therefore, channel is along a portion of the outside surface of the base. Bases using structural arrangements other than a shell can still have an outside surface for locating the channel.

Figure 5:
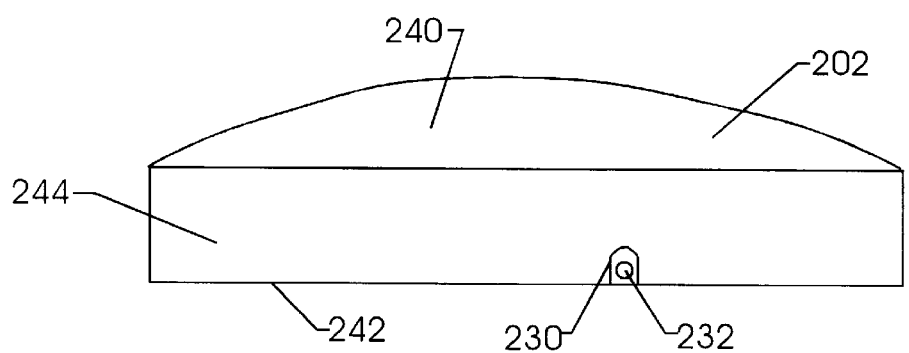
FIG. 5 is a side view of the baseball base of FIG. 4.

FIG. 5 is a side view of the baseball base 200. As can be seen from FIG. 5, the outside surface of base 200 includes a top surface 240, a bottom surface 242 and four side surfaces (one side surface 244 is shown in FIG. 5). Bottom surface 242 corresponds to the surface shown in FIG. 4. As can be seen from FIG. 4, microphone 232 does not protrude from outside surface 244. As can be seen from FIG. 5, microphone 232 does not protrude from outside surface 242.

Although the different planes of rubber shell 202 are labeled as different outside surfaces, in fact rubber shell is one continuous rubber member. In one embodiment, bottom surface 242 is not completely flat. Thus, microphone 232 may protrude from a first part of the bottom surface while not protruding a second part of the surface. In order for the base to be properly positioned on the ground, it is advantageous for microphone 232 to not protrude from the lowest part of bottom surface 242. For example, if the lowest part of bottom surface 242 is at or near the edge 243 of bottom surface 242, then the microphone should not protrude from the edge 243.

A visible outside surface is defined as the portions of the outside surface that are visible when the base is installed on the playing field. When base 200 is installed on a playing field, mounting post 222 is in the ground and bottom surface 242 is not visible. The only outside surfaces that are visible when base 200 is installed in the ground are the side surfaces and top surface 240.

Base 200 also includes a protective box 250 attached to baseplate 204 via screws 252 and 254 (see FIG. 4). Protective box 250 is used to hold transmitter 264 (see FIG. 6) and protect transmitter 264 from contaminants, while allowing easy access to transmitter 264 for maintenance purposes. There are various alternatives for attaching protective box 250 to baseplate 204. In base 200, protective box 250 is mounted such that a portion of protective box 250 is below the surface of baseplate 204 and a portion is above the surface of baseplate 204. Protective box 250 includes two holes 256 and 258 (depicted as dotted lines in FIG. 6) that allow wires to be threaded from the inside of protective box 250 to the outside of the box. Inside protective box 250 is RF transmitter 264 which is connected to microphone 232 by wire 260. Wire 260 is connected to the transmitter, threaded through hole 256 in protective box 250, placed behind baseplate 204 and shell 202, and connected to microphone 232 through a hole in channel 232 of shell 202. Because a view of wire 260 is blocked by baseplate 204, wire 260 is shown as a dotted line. Also connected to transmitter 264 via hole 258 is antenna 262 which, in the embodiment of FIG. 4 is also a wire. Transmitter 264 can be the same type of transmitter as transmitter 20, or another suitable alternative that fits within the base and can properly transmit the signal from the microphone.

Removably attached to protective box 250 is a cover 262. It is advantageous that cover 262 be removably attached to box 250 so that transmitter 20 can be easily accessed for maintenance purposes. Cover 262 is removably attached to protective box 250 via four screws 266. Cover 262 is machined such that it has four small holes next to larger holes. In FIG. 5 the small hole is filled by screws 266 and the larger is denoted by reference numeral 268. Screws 266 are threaded through the small holes in cover 262 and into holes 270 in protective box 250. Cover 262 can be removed from protective box 250 by loosening (but not necessarily removing) screws 266, sliding cover 262 in the direction of arrow 272 and lifting cover 262 such that the heads of screws 266 pass through large holes 268. Protective box 250 and cover 262 are preferably made of PVC; however, other materials may also be suitable (e.g. aluminum, etc.). In an alternate embodiment, cover 262 can be removably attached to protective box 250 using butterfly hinges that fold down to become at least partially flush with the top surface of cover 262. The butterfly hinges act as a quick release which may be easier to use than the four screws. An additional alternative includes using a zeuss fastener or quarter turn quick disconnect fastener.

Figure 6:
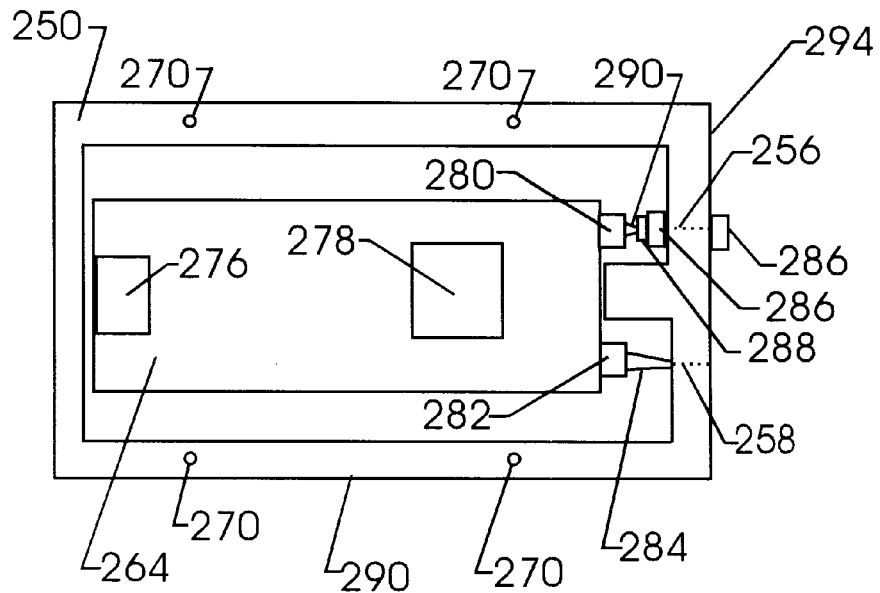
FIG. 6 is a top view of the protective box depicted in FIG. 4.

FIG. 6 shows a top view of protective box 250 after cover 262 has been removed. Inside protective box 250 is transmitter 264. At the bottom of transmitter 264 is a tab 276. By pulling on tab 276, transmitter 264 can be removed from protective box 250. Transmitter 264 has a control panel 278, which includes switches to turn on, change the gain of and change the frequency of the transmitter. At one end of transmitter 264 are connectors 280 and 282. Connector 282 couples transmitter 264 to antenna 262, which passes 7. through hole 258. Surrounding wire antenna 262 and abutting hole 258 is rubber sealing material 284 which is used to prevent contaminants (e.g. water, dust, etc.) from entering hole 258.

Connector 280 couples transmitter 264 to wire 260. Wire 260 passes through hole 256. Sealing material 286 abuts both sides of hole 256 and lines the inside of hole 256. An example of an appropriate sealing material is rubber; however, other suitable sealing materials may be used. Surrounding wire 260 and abutting sealing material 286 is a second sealing material 288. Sealing material 288 can also be rubber. A third sealing material 290 surrounds wire 260 and abuts both connector 280 and sealing material 288. Sealing material 290 is similar to sealing material 284. The sealing materials 286, 288 and 290 are used to prevent contaminants from entering protective box 250.

Figure 7:
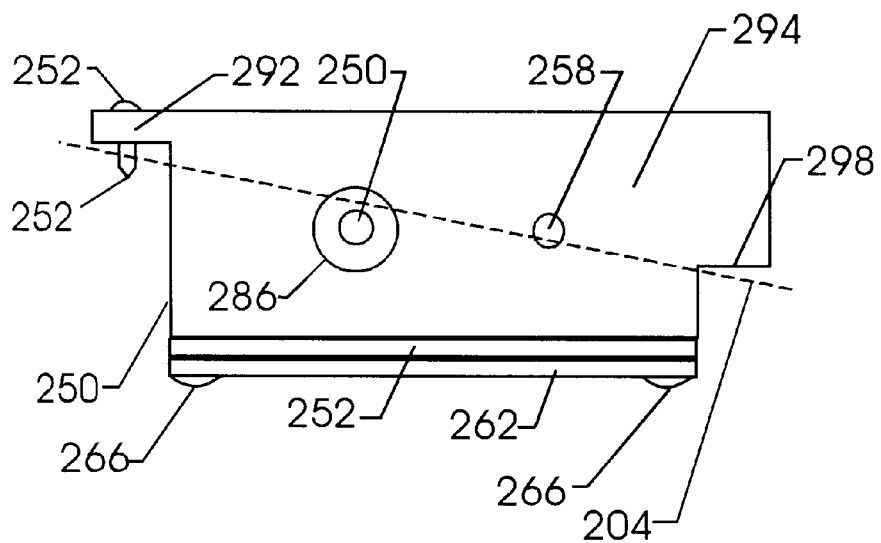
FIG. 7 is a side view of the protective box depicted in FIG. 4.

FIG. 7 is a side view of protective box 250, looking at side 294. FIG. 7 shows baseplate 204 as a dashed line. A rectangle is cut out of baseplate 204 so that protective box 250 can be inserted through the cut out rectangle. As can be seen, a portion of protective box 250 is below baseplate 204 and a portion is above baseplate 204. Protective box 250 is secured to baseplate 204 using screws 252 and 254 which secures lip 292 of protective box 250 to baseplate 204. Protective box 250 also includes ledge 294 which is in contact with baseplate 204.

Between cover 262 and protective box 250 is sealing material 252. One example of a suitable sealing material is a neoprene gasket. When screws 266 are tightened so that cover 262 is secured to box 250, transmitter 264 is protected from dust and moisture.

Figure 8:
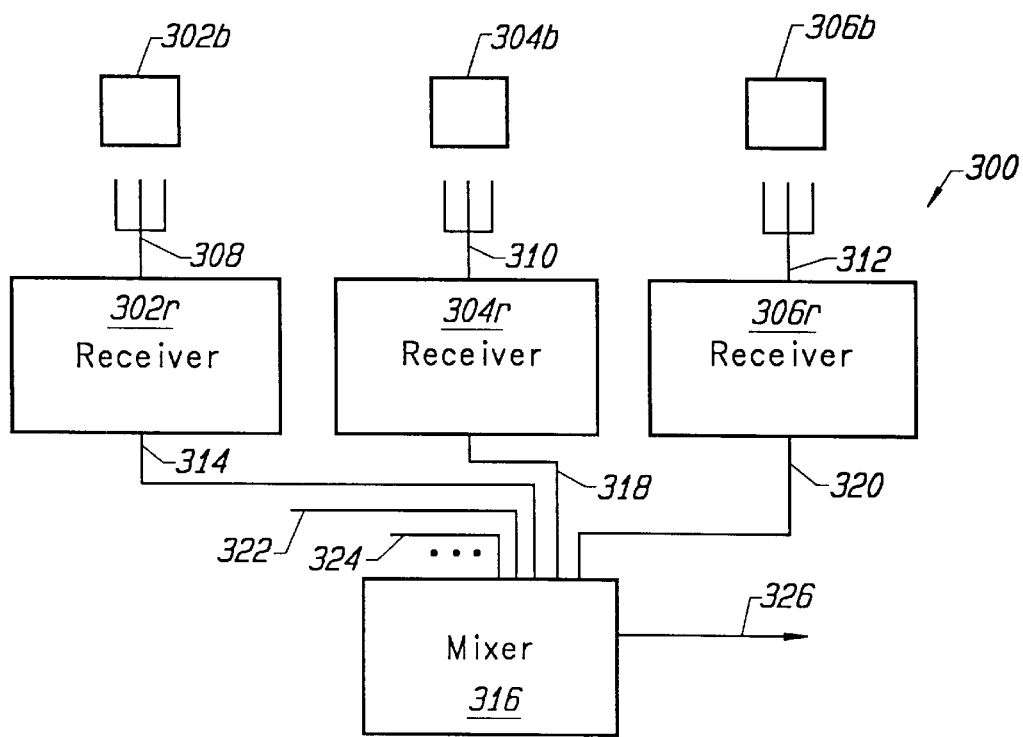
FIG. 8 is a block diagram of a system which can use the baseball base of the present invention.

FIG. 8 is a block diagram of one exemplar system 300 which can be used with three baseball bases 302*b*, 304*b* and 306. The three bases can utilize the technology described above with respect to base 10 or base 200. It is assumed, but not necessary, that base 302*b* is first base, base 304*b* is second base and base 306*b* is third base. Note that there is no difference between the bases other than that each base is programmed to transmit on a different frequency. Each base transmits its signal on a different frequency so that the signal can be distinguished. Furthermore, different sets of frequencies may be used in different cities because the spectrum allocation can vary on a city by city basis. System 300 includes three receivers 302*r*, 304*r* and 306*r*. Receiver 302*r* is tuned to receive the signal from base 302*b* via antenna 308. Receiver 304*r* is tuned to receive the signal from base 304*b* via antenna 310. Receiver 306*r* is tuned to receive the signal from base 306*b* via antenna 312. Many suitable RF receivers can be used. One exemplar receiver is the EM203 multi-channel receiver system sold by Sennheiser. The EM203 includes a chassis that houses three receivers. Each of the receivers sends a signal to mixer 316. Various alternatives include having the receivers filter, amplify or perform other operations on the received signal prior to transmission to mixer 316. In one embodiment a receiver can simply transmit the received signal to mixer 316. Furthermore, some suitable receivers may not need an external antenna.

Mixer 316 receives the signals (314, 318 and 320) from the three receivers (302r, 304r and 306r) as well as other audio sources (depicted by lines 322 and 324). The other audio sources can include additional receivers, microphones, tape decks, disc players, etc. Mixer 316 transmits one or more of the audio signals it receives, via signal 326, to broadcast or recording equipment. For example, the output 326 can be added to the audio portion of a television signal or can be sent to headphones for the announcers to hear. Mixer 326 can be operated to ignore all of the audio input, output one of the inputs or output a combination of inputs.

The system 300 can be used in conjunction with television or radio broadcasts during a baseball game. During the game, a microphone will pick up sounds from the field of play. The audio signal from the microphone is sent by a transmitter to one of the receivers which passes the signal to mixer 316. An operator of mixer 316 can choose to ignore or use the audio signal from a particular microphone. For example, if the operator can see that there is no action near third base, then the operator may choose to ignore any audio from the microphone inside third base. The operator may also listen to the audio signal from the third base microphone and decide whether to use the signal based on what can be heard. When the operator uses mixer 316 to select the audio signal from one or more microphones, those audio signals can be broadcasted with the television signal or radio signal so that viewers/listeners can hear the sounds of the game as if the viewer/listener had a front row seat. Since the microphone and transmitter are housed within the base, do not protrude from a visible surface of the base, and do not alter the size, shape or feel of the base, there is no distraction to the players and fans at the stadium.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for using a baseball base with a microphone during a baseball game, comprising:
   a baseball base having an outside surface and a channel along a portion of said outside surface;
   a microphone in said channel; and
   a transmitter connected to said microphone and secured to said baseball base at a location other than said channel.
2. A system according to claim 1, wherein:
   said channel is at least partially filled with a non-noisemaking substance.
3. A system according to claim 1, wherein:
   said channel is at least partially filled with a vibration absorbing substance.
4. A system according to claim 1, wherein:
   said baseball base includes a shell and a pad inside said shell.
5. A system according to claim 4, wherein:
   said channel is in said shell.
6. A system according to claim 1, further including:
   an antenna connected to said transmitter.
7. A system for using a baseball base with a microphone during a baseball game, comprising:
   a baseball base having an outside surface and a channel along a portion of said outside surface;
   a microphone in said channel;
   a transmitter connected to said microphone; and
   a protective box secured to said baseball base, said protective box including a cover removable attached to said protective box, said transmitter being inside said protective box.
8. A system according to claim 7, further including:
   a wire connecting said transmitter to said microphone, said protective box having an aperture allowing said wire to pass through said aperture, said protective box further including sealing material abutting said aperture.
9. A system according to claim 8, wherein:
   said channel is at least partially filled with a non-noisemaking, vibration absorbing substance.
10. A system for using a baseball base with a microphone during a baseball game on a playing field, comprising:
    a baseball base having a visible outside surface and a bottom;
    a microphone secured to said base such that said microphone does not protrude from said visible outside surface;
    a protective box secured to said bottom of said base;
    a cover removably attached to said protective box; and
    a transmitter inside said protective box, said transmitter connected to said microphone.
11. A system according to claim 10, further including:
    sealing material between said cover and said protective box.
12. A system according to claim 10, further including:
    an antenna, said protective box having an aperture for receiving said antenna; and
    sealing material abutting said aperture.
13. A system according to claim 10, further including:
    a conductor connecting said transmitter to said microphone, said protective box having an aperture for receiving said conductor; and
    sealing material abutting said aperture.
14. A system according to claim 13, further including:
    sealing material between said cover and said protective box.
15. A system according to claim 10, wherein:
    said base includes a channel along a portion of said visible outside surface;
    said microphone is secured within said channel; and
    said channel is at least partially filled with a non-noisemaking substance.
16. A system according to claim 10, wherein:
    said baseball base includes a shell, a pad inside said shell and a baseplate; and
    said protective box is attached to said baseplate.
17. A system for using baseball bases with microphones during a baseball game on a playing field, comprising:
    a first baseball base having a first visible outside surface and a first bottom;
    a first microphone secured to said first baseball base such that said first microphone does not protrude from said first visible outside surface;
    a first protective box secured to said first bottom of said first baseball base;

a first cover removably attached to said first protective box;

a first transmitter inside said first protective box, said first transmitter connected to said first microphone;

a second baseball base having a second visible outside surface and a second bottom;

a second microphone secured to said second baseball base such that said second microphone does not protrude from said second visible outside surface;

a second protective box secured to said second bottom of said second baseball base;

a second cover removably attached to said second protective box;

a second transmitter inside said second protective box, said second transmitter connected to said second microphone;

a third baseball base having a third visible outside surface and a third bottom;

a third microphone secured to said third baseball base such that said third microphone does not protrude from said third visible outside surface;

a third protective box secured to said third bottom of said third baseball base;

a third cover removably attached to said third protective box;

a third transmitter inside said third protective box, said third transmitter connected to said third microphone; and at least one receiver.

18. A system according to claim 17, further including:

first sealing material between said first cover and said first protective box;

second sealing material between said second cover and said second protective box; and third sealing material between said third cover and said third protective box.

19. A system according to claim 17, wherein:

said first baseball base includes a first shell, a first channel in said first shell, a first pad inside said first shell and a first baseplate;

said first protective box is attached to said first baseplate;

said first microphone is secured within said first channel;

said second baseball base includes a second shell, a second channel in said second shell, a second pad inside said second shell and a second baseplate; and said second protective box is attached to said second baseplate;

said second microphone is secured within said second channel;

said third baseball base includes a third shell, a third channel in said third shell, a third pad inside said third shell and a third baseplate;

said third protective box is attached to said third baseplate; and said third microphone is secured within said third channel.

\* \* \* \* \*

UNITED STATES PATENT AND TRADEMARK OFFICE
CERTIFICATE OF CORRECTION

| | | |
|---|---|---|
| PATENT NO. | : 5,963,849 | Page 1 of 1 |
| DATED | : October 5, 1999 | |
| INVENTOR(S) | : Hill, et al. | |

It is certified that error appears in the above-identified patent and that said Letters Patent is hereby corrected as shown below:

Claims,
Column 8, line 8, after "cover" and before "attached" delete "removable" and substitute therefor -- removably --

Signed and Sealed this

Twenty-third Day of October, 2001

Attest:

*Nicholas P. Godici*

Attesting Officer

NICHOLAS P. GODICI
*Acting Director of the United States Patent and Trademark Office*